(12) United States Patent
Aga et al.

(10) Patent No.: US 10,593,454 B2
(45) Date of Patent: Mar. 17, 2020

(54) SPHERICAL FERRITE PARTICLES IN NANO-SIZE AND METHOD OF MANUFACTURING SAME

(71) Applicant: POWDERTECH CO., LTD., Chiba (JP)

(72) Inventors: Koji Aga, Chiba (JP); Tetsuya Igarashi, Chiba (JP)

(73) Assignee: POWDERTECH CO., LTD., Chiba (JP)

( * ) Notice: Subject to any disclaimer, the term of this patent is extended or adjusted under 35 U.S.C. 154(b) by 173 days.

(21) Appl. No.: 15/511,727

(22) PCT Filed: Sep. 2, 2015

(86) PCT No.: PCT/JP2015/074941
§ 371 (c)(1),
(2) Date: Mar. 16, 2017

(87) PCT Pub. No.: WO2016/043051
PCT Pub. Date: Mar. 24, 2016

(65) Prior Publication Data
US 2017/0301443 A1    Oct. 19, 2017

(30) Foreign Application Priority Data
Sep. 19, 2014   (JP) ................................ 2014-191985

(51) Int. Cl.
| | | |
|---|---|---|
| *H01F 1/34* | (2006.01) | |
| *B82Y 40/00* | (2011.01) | |
| *G03G 9/107* | (2006.01) | |
| *B82Y 25/00* | (2011.01) | |
| *C09C 1/22* | (2006.01) | |
| *C09D 7/61* | (2018.01) | |
| *C09D 7/40* | (2018.01) | |
| *C09D 7/62* | (2018.01) | |
| *C01G 49/00* | (2006.01) | |
| *C09D 157/06* | (2006.01) | |
| *C08K 3/013* | (2018.01) | |
| *C08K 3/10* | (2018.01) | |
| *C08K 9/02* | (2006.01) | |
| *C08K 9/06* | (2006.01) | |

(52) U.S. Cl.
CPC .............. *H01F 1/344* (2013.01); *B82Y 25/00* (2013.01); *B82Y 40/00* (2013.01); *C01G 49/0072* (2013.01); *C09C 1/22* (2013.01); *C09D 7/61* (2018.01); *C09D 7/62* (2018.01); *C09D 7/70* (2018.01); *C09D 157/06* (2013.01); *G03G 9/107* (2013.01); *C01P 2004/03* (2013.01); *C01P 2004/32* (2013.01); *C01P 2004/61* (2013.01); *C01P 2004/62* (2013.01); *C01P 2004/64* (2013.01); *C01P 2004/84* (2013.01); *C01P 2006/12* (2013.01); *C01P 2006/40* (2013.01); *C01P 2006/42* (2013.01); *C08K 3/013* (2018.01); *C08K 3/10* (2013.01); *C08K 9/02* (2013.01); *C08K 9/06* (2013.01); *C08K 2201/005* (2013.01); *C08K 2201/01* (2013.01)

(58) Field of Classification Search
CPC .. H01F 1/344; C09D 7/62; C09D 7/61; C09D 7/70; C01G 49/0036; C01G 49/0072; C09C 1/22
See application file for complete search history.

(56) References Cited

U.S. PATENT DOCUMENTS

| | | | |
|---|---|---|---|
| 6,124,067 A * | 9/2000 | Mikuriya | G03G 9/09708 430/100 |
| 2002/0017628 A1 * | 2/2002 | Akimoto | H01F 1/36 252/62.56 |
| 2007/0196671 A1 * | 8/2007 | Kobayashi | B82Y 25/00 428/447 |
| 2008/0206664 A1 | 8/2008 | Shinmura et al. | |
| 2008/0241729 A1 | 10/2008 | Kayamoto et al. | |
| 2009/0130587 A1 | 5/2009 | Kayamoto et al. | |
| 2011/0013948 A1 | 1/2011 | Aga et al. | |
| 2011/0244389 A1 | 10/2011 | Kojima et al. | |
| 2015/0192874 A1 | 7/2015 | Kinoshita et al. | |

FOREIGN PATENT DOCUMENTS

| | | | |
|---|---|---|---|
| CN | 1335283 | * | 2/2002 |
| EP | 2402820 A1 | | 6/2011 |
| EP | 2615499 | * | 7/2013 |

(Continued)

OTHER PUBLICATIONS

European Search report issued with respect to Application No. 15842995.1, dated Jun. 19, 2018.
International Search Report issued with respect to Application No. PCT/JP2015/074941, dated Nov. 24, 2015.
International Preliminary Report on Patentability issued with respect to Application No. PCT/JP2015/074941, dated Mar. 21, 2017.
Taiwanese Office Action issued with respect to Application No. 104129742, dated Aug. 9, 2018.

*Primary Examiner* — C Melissa Koslow
(74) *Attorney, Agent, or Firm* — Greenblum & Berstein, P.L.C.

(57) ABSTRACT

An object is to provide the ferrite particles used as a magnetic filler or a raw material for a molded product excellent in dispersibility as a powder and excellent in uniformity after molding and result the surface with small unevenness; and a method of manufacturing the particles. To achieve the object, Mn—Mg ferrite particles having an average particle size of 1 to 2000 nm and having a spherical shape are employed. It is preferable that the ferrite particles are produced by a method including subjecting of a ferrite raw material obtained through preparation of a ferrite composition to flame-spraying in air for ferritization followed by rapid cooling for solidifying of the ferrite.

6 Claims, 1 Drawing Sheet

(56) References Cited

FOREIGN PATENT DOCUMENTS

| | | | |
|---|---|---|---|
| EP | 2615499 | A1 | 7/2013 |
| JP | S58-123550 | A | 7/1983 |
| JP | 59-111159 | * | 6/1984 |
| JP | S59-111159 | A | 6/1984 |
| JP | S62-50839 | A | 3/1987 |
| JP | H03-233464 | A | 10/1991 |
| JP | 2011-170272 | A | 9/2011 |
| JP | 2012-181398 | A1 | 9/2012 |
| JP | 2013-137455 | A | 7/2013 |
| WO | 2007/063933 | A1 | 6/2007 |

* cited by examiner

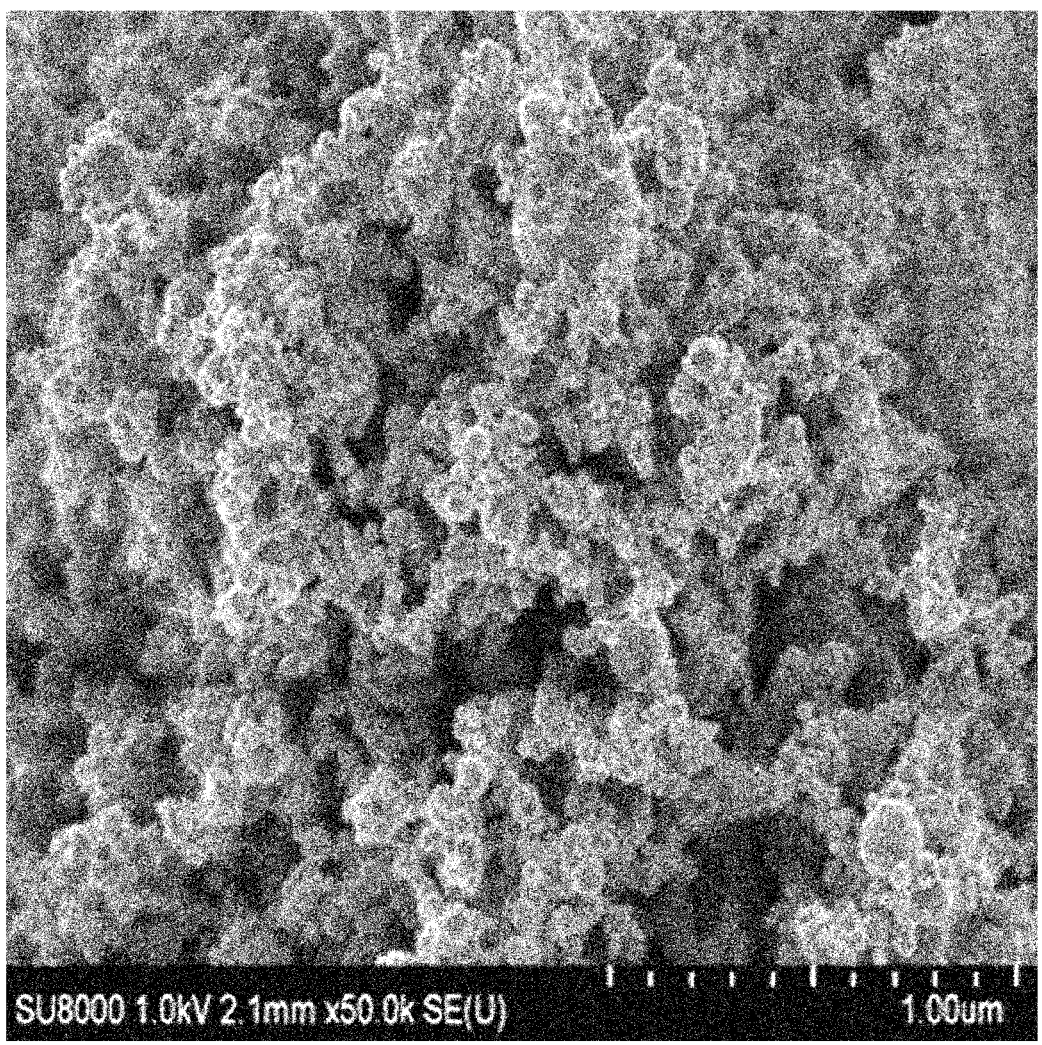

SPHERICAL FERRITE PARTICLES IN NANO-SIZE AND METHOD OF MANUFACTURING SAME

TECHNICAL FIELD

The present invention relates to the spherical ferrite particles having a spherical shape, a specific ferrite composition, and a predetermined particle size and to a method of manufacturing the ferrite particles. In particular, present invention relates to the spherical ferrite particles used as a magnetic filler or a raw material for a molded product that is excellent in dispersibility as a powder, excellent in uniformity after molding and result the surface with small unevenness and to a method of manufacturing the ferrite particles.

BACKGROUND ART

In methods of manufacturing the ferrite particles, popular methods includes mixing of predetermined amounts of raw materials for the ferrite particles, calcining, pulverizing, granulating followed by sintering. The calcining may be skipped depending on the conditions.

However, such a conventional method of manufacturing the ferrite particles has various problems. Specifically, in the sintering step for magnetization by ferritization reaction, as a tunnel kiln is typically used to sinter a raw material charged in a saggar, the shape of the particles tends to be irregular due to interaction among the particles. If the particle size of the ferrite particles should be smaller, the block-shape tends to be more significant after sintering to results irregularly-shaped particles by chipping in pulverizing. In addition, if the ferrite particles having a small particle size should be produced, the particles produced cannot have a preferable shape without vigorous pulverization. There is also a problem in that the production stability is poor because the required time for the sintering is about 12 hours including a period for elevating the temperature, a period for keeping the maximum temperature, and a period for decreasing the temperature, and the blocks formed after the sintering should be pulverized.

To solve such problems, new methods of manufacturing the ferrite particles have been proposed. For example, Patent Document 1 (Japanese Patent Laid-Open No. 62-50839) discloses a method of manufacturing a ferrite carrier in which a blended metal oxides as raw materials for ferrite formation is passed through a high-temperature flame environment to quickly ferritize the blended metal oxides.

In addition, Patent Document 2 (Japanese Patent Laid-Open No. 2008-216339) discloses a method of manufacturing a core material of an electrophotographic ferrite carrier under predetermined conditions in which a raw material powder with an average particle size of 20 to 50 μm is charged into a combustion flame with a carrier gas for the raw material powder and flame-spraying the powder for ferritizing the powder followed by rapid cooling for solidifying of the flame-sprayed particle in atmospheric air, and collecting the powder.

Furthermore, Patent Document 3 (Japanese Patent Laid-Open No. 2008-249855) discloses a resin-coated carrier for an electrographic developer including the ferrite carrier core material having a BET specific surface area of 900 to 5000 $cm^2/g$ and an apparent density of 2.30 to 2.80 $g/cm^3$. Also for the method of manufacturing the ferrite carrier core material, it is considered preferable that a raw material powder is charged into combustion flame with a carrier gas for the raw material powder, flame-sprayed for ferritization of the powder followed by rapid cooling for solidifying in atmospheric air, and collected.

However, as the ratio between oxygen to the combustion gas is 3.5 or less in these production methods, the sintering may be difficult depending on the ferrite raw materials. In addition, these methods are not suitable for manufacturing a small-diameter ferrite particle and are not capable of forming the spherical ferrite particles uniformly.

Patent Document 4 (Japanese Patent Laid-Open No. 3-233464) discloses a method of manufacturing a carrier for an electrographic developer in which a carrier raw material is melted by a direct plasma process, high-frequency plasma process, or hybrid plasma process.

However, as such production method uses an expensive gas such as argon or helium, the method is very disadvantageous economically and impractical.

Fillers conventionally used are a pulverized product of a ferrite powder or calcined powder as a precursor of the ferrite powder having an irregular shape. Thus, gaps tend to be formed among particles in a coating or molding process, and uniform volume change does not occur during post-treatment (heating or sintering) carried out after molding, and it results, for example, generation of pores in the coated product or molded product or uneven sintering of the molded product. These phenomena tends to be more evident in the molded product or coated product of thinner and smaller.

DOCUMENTS CITED

Patent Documents

[Patent Document 1] Japanese Patent Laid-Open No. 62-50839
[Patent Document 2] Japanese Patent Laid-Open No. 2008-216339
[Patent Document 3] Japanese Patent Laid-Open No. 2008-249855
[Patent Document 4] Japanese Patent Laid-Open No. 3-233464

As described above, the ferrite particles that is excellent in dispersibility as a powder and excellent in uniformity after molding and result the surface with small unevenness and a method of manufacturing the particles have not been found.

SUMMARY OF INVENTION

Problems to be Solved

So, an object of the present invention is to provide the ferrite particles used as a magnetic filler or as a raw material for a molded product excellent in dispersibility as a powder and excellent in uniformity after molding and result the surface with small unevenness; and a method of manufacturing the particles.

Means to Solve the Problem

As a result of extensive investigation to solve the problems described above, the present inventors have arrived at the present invention by thinking out that the ferrite particles having a spherical shape, a specific ferrite composition, and a predetermined particle size have the performance meeting the above object.

The present invention provides Mn—Mg ferrite particles having an average particle size of 1 to 2000 nm and having a spherical shape.

The ferrite particles according to the present invention are preferable to contain 13 to 25% by weight of Mn, 1 to 3.5% by weight of Mg, and 43 to 57% by weight of Fe.

The ferrite particles according to the present invention are preferable to further contain 0 to 1.5% by weight of Sr.

The ferrite particles according to the present invention are preferable to be surface-treated with an Al compound.

The ferrite particles according to the present invention are preferable to be surface-treated with a coupling agent.

The present invention further provides a method of manufacturing the ferrite particles, the method includes subjecting a ferrite raw material obtained through preparation of a ferrite precursor composition to flame-spraying in air for ferritization followed by rapid cooling for solidifying of the ferrite.

Advantages of the Invention

As the ferrite particles according to the present invention have a spherical shape, a specific ferrite composition and a predetermined particle size, the ferrite particles are excellent in dispersibility as a powder and excellent in uniformity after molding and result the surface with small unevenness. Therefore, the ferrite particles according to the present invention can be used as a magnetic filler or as a raw material for a molded product.

BRIEF DESCRIPTION OF DRAWING

FIG. 1 is a scanning electron microscopic photograph (×50000) of the ferrite particles manufactured in Example 1.

PREFERRED EMBODIMENTS OF THE INVENTION

Embodiments of the present invention will be described.
<Ferrite Particles According to the Present Invention>

The ferrite particles according to the present invention have a predetermined particle size, a spherical shape, and a Mn—Mg ferrite composition, as described later. As the ferrite particles have such a shape and particle size, the particles are excellent in dispersibility as a powder and uniformity.

The words "spherical shape" refers to a shape in which the average degree of sphericity is 1 to 1.2, preferable to be 1 to 1.1, and more preferable to be as close to 1 as possible. If the average degree of sphericity exceeds 1.2, sphericity of the ferrite particles is poor.

(Average Degree of Sphericity)

In the determination of the degree of sphericity, an image using a FE-SEM (SU-8020, manufactured by Hitachi High-Technologies Corporation) with a magnification of 200000 to count a total of 100 or more particles in the field of view is taken. The obtained SEM image is read by a scanner, the image is analyzed using an image analysis software, "Image-Pro PLUS" available from MEDIA CYBERNETICS, the diameters of the circumscribed circle and inscribed circle of each particle are measured by manual examination, and their ratio (circumscribed circle diameter/inscribed circle diameter) is determined as the degree of sphericity. If the two diameters are equal, the ratio is 1. For an exact sphere, the ratio is 1. The average of values of the ratio determined for 100 particles is determined as the average degree of sphericity.

(Average Particle Size (Horizontal Feret Diameter))

The image at a magnification of 200000 with the same manner for the average degree of sphericity is taken followed by measuring of the horizontal Feret diameters by manual examination, the average of the diameters is determined as the average particle size.

The composition of the ferrite particles according to the present invention is preferable to be 13 to 25% by weight of Mn, 1 to 3.5% by weight of Mg, and 43 to 57% by weight of Fe. As the ferrite particles have such a ferrite composition, the particles are suitable for use as a raw material for a molded product for absorbing electromagnetic waves in the range of 1 MHz to 10 GHz. The ferrite particles may be used by being mixed and dispersed in a resin or the like without being subjected to a process such as sintering, or the ferrite particles may be formed into a desired shape by a process such as molding, granulation, or coating and then subjected to sintering, and the resulting sintered product may be used.

As the Mn content of less than 13 parts by weight or the Mg content of more than 3.5% by weight makes the magnetic moment of the ferrite small, the electromagnetic wave shielding ability may be low. So, it is not preferable. If the Mn content is more than 25 parts by weight or the Mg content is less than 1% by weight, the magnetic moment can be large, but it is not preferable because the frequency characteristic may shift to the lower frequency side. So, it is not preferable. Although the Fe content of less than 43% by weight may increase the resistivity of the ferrite, the electromagnetic wave shielding ability may be lower because the magnetic moment of the ferrite is made small. The Fe content of more than 57% by weight is not preferable because the frequency characteristic may shift to the lower frequency side.

It is preferable that the ferrite particles according to the present invention contain Sr in addition to the composition described above. Sr contributes to not only control of the uniformity during sintering but eases fine adjustment of the frequency characteristic of the ferrite particles. It is preferable that the Sr content is 0 to 1.5% by weight. The Sr content of exceeding 1.5% by weight may makes the electromagnetic wave shielding ability poor drastically because the effect as a hard ferrite comes to appear.

(Fe, Mn, Mg, and Sr Contents)

The Fe, Mn, Mg, and Sr contents are determined as follows.

0.2 g of the ferrite particles weighed are fully dissolved in a hot mixture of 60 ml of pure water with 20 ml of 1 N hydrochloric acid and 20 ml of 1 N nitric acid to prepare an aqueous solution. Then Fe, Mn, Mg, and Sr contents in the solution are determined using an ICP analyzer (ICPS-1000IV, manufactured by Shimadzu Corporation).

The average particle size of the ferrite particles according to the present invention is 1 to 2000 nm. If the average particle size is less than 1 nm, the dispersibility of the particles is poor because the degree of aggregation of the particles may be so great even if they are surface-treated. If the average particle size exceeds 2000 nm, the surface unevenness after molding tends to be large. The average particle size is preferable to be 1 to 800 nm. More preferable average particle size is 1 to 300 nm.

It is preferable that the ferrite particles according to the present invention are surface-treated with an Al compound. As the surface-treatment with an Al compound reduces the possibility of the ferrite particles contacting with each other in a molded product, electrical resistivity may increase. Examples of the Al compound include aluminum sulfate and sodium aluminate. The amount of the surface-treatment agent calculated as Al is 0.2 to 1% by weight against to the ferrite particles.

It is preferable that the ferrite particles according to the present invention are surface-treated with a coupling agent. Surface-treatment with a coupling agent increase the dispersibility in a resin used in a molded product. Various silane coupling agents, titanate coupling agents, aluminate coupling agents can be used as the coupling agent. Decyltrimethoxysilane and n-octyltriethoxysilane are more preferable to be used. Although the amount may vary depending on the BET specific surface area of the particles, the amount of the surface-treatment agent calculated as a silane coupling agent is 0.05 to 2% by weight against to the ferrite particles.

<Method of Manufacturing the Ferrite Particles According to the Present Invention>

Next, the method of manufacturing the ferrite particles according to the present invention will be described.

In the method of manufacturing the ferrite particles according to the present invention, a ferrite raw material obtained through preparation of a ferrite precursor composition having a predetermined composition ratio is subjected to flame-spraying in air for ferritization, followed by rapid cooling for solidifying.

The process of preparing a ferrite raw material having a composition ratio described above is not particularly limited, and a conventionally-known process can be employed. A dry process may be used or a wet process may be used.

In an example of the process of preparing the ferrite raw material (granulated product), an appropriate amount of a ferrite precursor composition composed of a Fe material and at least one selected from Mn, Mg, or Sr material is weighed, and then prepare a slurry by adding the water to the composition and pulverizing. The granulated product having a predetermined particle size is prepared by subjecting the slurry prepared by pulverizing for granulation using a spray dryer, followed by classification. In view of the particle size of the ferrite particles to be manufactured, it is preferable that the particle size of the granulated product is about 3 to 10 μm. In another embodiment, the granulated product having a predetermined particle size is prepared through, mixing of the appropriate amount weighed raw materials for a ferrite composition, pulverizing, dispersing by dry pulverization, and granulating using a granulator, followed by classification.

The granulated product prepared is subjected to flame-spraying in air for ferritization. In the flame-spraying, a combustion gas and oxygen are used to generate combustion flame, and the volume ratio between the combustion gas and oxygen is 1:3.5 to 1:6.0. If the ratio of oxygen to the combustion gas in the combustion flame is less than 3.5, sufficient melting is not achieved. If the ratio of oxygen to the combustion gas exceeds 6.0, ferritization is made difficult. For example, oxygen at a rate of 35 to 60 $Nm^3/hr$ is used against the combustion gas rate of 10 $Nm^3/hr$.

Examples of the combustion gas used for the flame-spraying include propane gas, propylene gas, and acetylene gas and, in particular, propane gas is suitably used. The carrier gas for the granulated product used may be nitrogen, oxygen, or air. The linear velocity of the granulated product is preferable to be 20 to 60 m/sec.

The ferrite particles ferritized through flame-spraying are rapidly cooled and solidified in water or in a room-temperature atmosphere and then collected by a filter.

The ferrite particles collected by a filter may be subjected to classification according to needs. An popular method such as wind classification, mesh filtration, or settling classification may be used as the classification method to achieve particle size control for achieving a desired particle size. The collection may be accomplished by separating large-diameter particles with a cyclone or the like.

Hereinafter, the present invention will be specifically described based on examples.

EXAMPLES

Example 1

Iron oxide, manganese oxide, and magnesium oxide were weighed at a molar ratio of 50:40:10 and further, strontium oxide in an amount of 0.5 moles per 100 moles of the total of the three oxides was added and mixed. Water was added to the mixture and pulverized to prepare the slurry adjusted the solid content of 50% by weight. The slurry prepared was subjected to granulation using a spray dryer, followed by classification to prepare a granulated product having an average particle size of 5 μm.

Next, the granulated product prepared was flame-sprayed at a linear velocity of about 40 m/sec by exposing it to combustible gas combustion flame in which the ratio propane:oxygen was 10 $Nm^3/hr$:35 $Nm^3/hr$ followed by rapid cooling, collecting by a filter, and then classified to manufacture the ferrite particles.

Example 2

Ferrite particles were manufactured in the same manner as in Example 1, except that iron oxide, manganese oxide, and magnesium oxide were weighed at a molar ratio of 42.2:44.4:13.3 and further, strontium oxide in an amount of 0.5 moles per 100 moles of the total of the three oxides was added and mixed.

Example 3

Ferrite particles were manufactured in the same manner as in Example 1, except that iron oxide, manganese oxide, and magnesium oxide were weighed at a molar ratio of 46:44:10 and further, strontium oxide in an amount of 0.5 moles per 100 moles of the total of the three oxides was added and mixed.

Example 4

Ferrite particles were manufactured in the same manner as in Example 1, except that iron oxide, manganese oxide, and magnesium oxide were weighed at a molar ratio of 58:32:10 and further, strontium oxide in an amount of 0.5 moles per 100 moles of the total of the three oxides was added and mixed.

Example 5

Ferrite particles were manufactured in the same manner as in Example 1, except that iron oxide, manganese oxide, and magnesium oxide were weighed at a molar ratio of 47.8:44.5:7.7 and further, strontium oxide in an amount of 0.55 moles per 100 moles of the total of the three oxides was added and mixed.

Example 6

Ferrite particles were manufactured in the same manner as in Example 1, except that strontium oxide in an amount of 1.25 moles per 100 moles of the total of the iron oxide, manganese oxide, and magnesium oxide was added and mixed.

Example 7

Ferrite particles were manufactured in the same manner as in Example 1, except that strontium oxide was not added.

Comparative Example 1

Ferrite particles were manufactured in the same manner as in Example 1, except that the granulated product was fired at 1200° C. for 4 hours in an electric furnace under an atmosphere: an oxygen concentration of 0 vol % ($N_2$ atmosphere), and the fired product was pulverized.

Comparative Example 2

Ferrite particles were manufactured in the same manner as in Example 1, except that a granulated product having an average particle size of 39 μm was prepared by changing the condition of the spray dryer, the granulated product was fired at 1200° C. for 4 hours in an electric furnace under an atmosphere: an oxygen concentration of 0 vol % ($N_2$ atmosphere), and the fired product was pulverized.

Table 1 shows the blending molar ratio, the production method, the chemical analysis data, and the powder properties and magnetic properties (the shape, average particle size, BET specific surface area, magnetization, and powder resistivity) in Examples 1 to 7 and Comparative Examples 1 to 2. Note that the words "spherical" shape in Table 1 refers to a shape in which the average degree of sphericity is 1.2 or less. In Examples 1 to 7, the average particle size was determined as the horizontal Feret diameter as described above, while in Comparative Examples 1 to 2, the average particle size was determined as the volume average particle size as described later. The methods of determining the BET specific surface area, magnetic properties, and resistivity shown in Table 1 were as described later, and the methods of determining the other properties were as described above. A scanning electron microscopic photographic image (×50000) of the ferrite particles manufactured in Example 1 is shown in FIG. 1.

(Volume Average Particle Size (Microtrac Method))

The volume average particle size was determined as follows. The volume average particle size was examined using a Microtrac particle size analyzer (Model 9320-X100) manufactured by NIKKISO CO., LTD. Water was used as the dispersion medium. 10 g of the sample (resin-coated ferrite carrier) weighed and 80 ml of water were placed in a 100 ml beaker, into which 2 to 3 droplets of a dispersant (sodium hexametaphosphate) was added. Next, an ultrasonic homogenizer (UH-150, manufactured by SMT. Co., LTD.) set to the output level 4 for 20 seconds was used to finish dispersing. After that, bubbles generated on the surface of the beaker were removed, and the sample was then introduced into the analyzer.

(BET Specific Surface Area)

In the determination of the BET specific surface area, a specific surface area analyzer (model: Macsorb HM model-1208 (manufactured by Mountech Co., Ltd.)) was used. About 0.5 to 4 g of an examination sample (ferrite particles) was put in a standard sample cell specialized for the specific surface area examination apparatus, the weight of the sample was accurately determined with a precision balance, and then the sample was set to the measurement port to start the examination. The examination was carried out using a one-point method, in which the BET specific surface area is automatically calculated upon input of the weight of the sample at the end of examination. The examination was carried out with a pretreatment in which about 10 g of the examination sample was collected in a medicine paper, then degassed using a vacuum dryer to achieve a degree of vacuum of −0.1 MPa followed by heating at 200° C. for 2 hours after confirmation that a degree of vacuum is −0.1 MPa.

Environment: Temperature of 10 to 30° C.; Relative Humidity of 20 to 80%; No dew condensation (Magnetic Properties)

The magnetic properties were determined using a vibrating sample magnetometer (model: VSM-C7-10A (manufactured by Toei Industry Co., Ltd.)). The examination sample (ferrite particles) was packed in a cell having an inner diameter of 5 mm and a height of 2 mm and set to the magnetometer. In the examination, a magnetic field was applied and swept to 3 K·1000/4π·A/m. Next, the applied magnetic field was decreased, and a hysteresis curve was drawn on a recording paper. The magnetization achieved when the applied magnetic field was 5 K·1000/4π·A/m was read from the drawn curve.

(Powder Resistivity)

A cylinder made of fluorine-containing resin and having a cross-sectional area of 4 cm² was packed a height of 4 mm with the sample (ferrite particles), and electrodes were mounted on both surfaces of the sample, and a 1 kg weight was further placed on the top to carry out resistivity examination. In the resistivity examination, 6517 A insulation resistivity meter manufactured by Keithley Instruments was used, a measurement voltage of 25 V was applied, then the resistivity was examined after 60 seconds, and the volume resistivity was determined.

TABLE 1

| | Blending molar ratio | | | | Production method | Chemical analysis (ICP) (% by weight) | | | | Powder properties and magnetic properties | | | | |
| --- | --- | --- | --- | --- | --- | --- | --- | --- | --- | --- | --- | --- | --- | --- |
| | $Fe_2O_3$ | MnO | MgO | SrO | | Fe | Mn | Mg | Sr | Shape | Average particle size (μm) | BET specific surface area (m²/g) | Magnetization*1 ($Am^2$/kg) | Powder resistivity (Ω·cm) |
| Example 1 | 50 | 40 | 10 | 0.5 | Flame-spraying Capture by filter | 49.4 | 19.4 | 2.15 | 0.39 | Spherical | 0.098 | 28.4 | 50.58 | $5.3 \times 10^6$ |
| Example 2 | 42.2 | 44.4 | 13.3 | 0.5 | Flame-spraying Capture by filter | 44.8 | 23.2 | 3.08 | 0.46 | Spherical | 0.106 | 25.3 | 61.65 | $8.4 \times 10^7$ |

TABLE 1-continued

| | Blending molar ratio | | | | Production method | | Chemical analysis (ICP) (% by weight) | | | | Shape | Powder properties and magnetic properties | | | |
|---|---|---|---|---|---|---|---|---|---|---|---|---|---|---|---|
| | $Fe_2O_3$ | MnO | MgO | SrO | | | Fe | Mn | Mg | Sr | | Average particle size (μm) | BET specific surface area ($m^2/g$) | Magnet- ization*1 ($Am^2/$ kg) | Powder resistivity ($\Omega \cdot cm$) |
| Example 3 | 46 | 44 | 10 | 0.5 | Flame- spraying | Capture by filter | 46.9 | 22.1 | 2.22 | 0.4 | Spher- ical | 0.123 | 22.1 | 56.94 | $1.1 \times 10^7$ |
| Example 4 | 58 | 32 | 10 | 0.5 | Flame- spraying | Capture by filter | 53.9 | 14.6 | 2.02 | 0.36 | Spher- ical | 0.112 | 23.6 | 39.09 | $9.2 \times 10^5$ |
| Example 5 | 47.8 | 44.5 | 7.7 | 0.55 | Flame- spraying | Capture by filter | 47.7 | 21.8 | 1.69 | 0.44 | Spher- ical | 0.099 | 27.6 | 55.12 | $8.9 \times 10^6$ |
| Example 6 | 50 | 40 | 10 | 1.25 | Flame- spraying | Capture by filter | 49 | 19.3 | 2.13 | 0.96 | Spher- ical | 0.096 | 29.1 | 50.25 | $6.9 \times 10^6$ |
| Example 7 | 50 | 40 | 10 | 0 | Flame- spraying | Capture by filter | 49.6 | 19.5 | 2.16 | 0 | Spher- ical | 0.118 | 22.8 | 50.83 | $2.5 \times 10^6$ |
| Compar- ative Example 1 | 50 | 40 | 10 | 0.5 | Electric furnace | Pulver- ization | 47.2 | 18.6 | 2.05 | 0.37 | Irreg- ular | 1.821 | 1.82 | 40.6 | $2.5 \times 10^6$ |
| Compar- ative Example 2 | 50 | 40 | 10 | 0.5 | Electric furnace | De- agglom- eration | 48.86 | 19.22 | 2.13 | 0.38 | Gran- ular | 35.22 | 0.081 | 59.61 | $8.5 \times 10^7$ |

*1: Magnetization achieved at 5 K · 1000/4π · A/m

Example 8

The ferrite particles manufactured in Example 1 were dispersed in water to adjust a solid content 10% by weight, and drops of an aqueous solution of aluminum sulfate was added into the slurry to surface-treat the ferrite particles. In the treatment, aqueous ammonia solution was added to adjust pH of the slurry at 7.5 to 8.5. The amount of the treatment agent calculated as aluminum was 0.5% by weight against to the ferrite particles (powder), and the aqueous solution of aluminum sulfate was prepared to make an aluminum concentration 10% by weight. The slurry containing the surface-treated ferrite particles was filtrated, followed by drying at 120° C. for 8 hours to remove water and then the ferrite particles surface-treated with an Al compound were manufactured by pulverization with a sample mill.

Example 9

The ferrite particles manufactured in Example 1 were dispersed in water to adjust a solid content 10% by weight, and drops of an aqueous solution of sodium aluminate was added into the slurry to surface-treat the ferrite particles. In the treatment, an aqueous solution of acetic acid was added to adjust pH of the slurry at 8.5 to 9.5. The amount of the treating agent calculated as aluminum was 0.5% by weight against to the ferrite particles (powder), and the aqueous solution of sodium aluminate was prepared to make an aluminum concentration 10% by weight. The slurry containing the surface-treated ferrite particles was filtrated, followed by drying at 120° C. for 8 hours to remove water and then the ferrite particles surface-treated with an Al compound were manufacture by pulverization with a sample mill.

Example 10

The aqueous solution dispersed water, decyltrimethoxysilane, and acetic acid was prepared, and the ferrite particles manufactured in Example 1 were added to adjust a solid content 10% by weight and were dispersed. After that, aqueous ammonia solution was added to the resulted slurry to adjust a pH from 7.5 to 8.5 to surface-treat the ferrite particles. In the treatment, the amount of the treatment agent calculated as a silane coupling agent was 0.1% by weight against to the ferrite particles (powder). The slurry containing the surface-treated ferrite particles was dried at 180° C. for 6 hours to remove water, and the ferrite particles surface-treated with a silane coupling agent were manufacture by pulverization with a sample mill.

Example 11

Ferrite particles surface-treated with decyltrimethoxysilane were manufactured in the same manner as in Example 10, except for using the Al-surface-treated ferrite particles manufactured in Example 8.

Example 12

The Al-surface-treated ferrite particles manufactured in Example 8 were surface-treated with n-octyltriethoxysilane. The treatment conditions were 180° C. for 6 hours, and the amount of the treatment agent calculated as a silane coupling agent was 0.08% by weight against to the ferrite particles (powder).

Table 2 shows the raw material particles, the conditions of surface-treatment with an Al compound (the surface-treatment agent, the amount of the treatment agent, and pH), the conditions of surface-treatment with a silane coupling agent (the surface-treatment agent, the amount of the treatment agent, and the heat treatment conditions), and the powder resistivity of the ferrite particles manufactured in Examples 8 to 12. The method of examining the powder resistivity was as described above.

TABLE 2

| | Raw material particles | Surface-treatment (Al compound) | | | Surface-treatment (silane coupling agent) | | | Powder resistivity ($\Omega \cdot cm$) |
| | | Surface-treatment agent | Amount of treatment agent (Amount of Al against to powder) (% by weight) | pH | Surface-treatment agent | Amount of treatment agent (Amount of silane coupling agent against to powder) (% by weight) | Heat treatment conditions | |
| --- | --- | --- | --- | --- | --- | --- | --- | --- |
| Example 8 | Particles manufactured in Example 1 | $Al_2(SO_4)_3$ | 0.5 | 7.5-8.5 | — | — | — | $7.3 \times 10^8$ |
| Example 9 | Particles manufactured in Example 1 | $NaAlO_3$ | 0.5 | 8.5-9.5 | — | — | — | $3.5 \times 10^8$ |
| Example 10 | Particles manufactured in Example 1 | — | — | 7.5-8.5 | Decyltrimethoxysilane*2 | 0.1 | 180° C. × 6 hr | $1.3 \times 10^7$ |
| Example 11 | Particles manufactured in Example 8 | $Al_2(SO_4)_3$ | 0.5 | 7.5-8.5 | Decyltrimethoxysilane*2 | 0.1 | 180° C. × 6 hr | $9.3 \times 10^8$ |
| Example 12 | Particles manufactured in Example 8 | $Al_2(SO_4)_3$ | 0.5 | 7.5-8.5 | n-octyltriethoxysilane*3 | 0.08 | 180° C. × 6 hr | $7.8 \times 10^8$ |

*2: Product name "KBM 3103C" (manufactured by Shin-Etsu Chemical Co., Ltd.)
*3: Product name "A-137" (manufactured by Momentive Performance Materials Japan LLC)

The ferrite particles manufactured in Examples 1 to 12 and Comparative Examples 1 to 2 each were mixed with a binder to prepare the ink for the coating film formation. Table 3 shows the conditions of preparation of the ink for the coating films formation (the method of mixing the ferrite particles and binder and the type of the binder), the unevenness evaluation (the substrate and the surface unevenness after drying), and the finesse evaluation (the substrate, the main sintering temperature, and the finesse).

(Preparation of Ink for Coating Film Formation (Aqueous System))

In Examples 1 to 9 and Comparative Examples 1 to 2, the ferrite particles each were mixed with water to adjust a solid content about 60% by weight, and agar was added in an amount of 1.5% by weight against to water. Dispersing was carried out using ULTRA-TURRAX manufactured by IKA under heating up to 100° C. to dissolve the agar and evaporate water to adjust a solid content 65% by weight. After that, dispersing and stirring were continued under cooling to 50° C. to finish the ink for coating film formation. Note that, in Comparative Example 2, the mixing was carried out using a stirrer.

(Preparation of the Ink for Coating Film Formation (Solvent System))

In Examples 10 to 12, 65% by weight of the ferrite particles, 12% by weight of acrylic resin calculated as solid resin content, and 48% by weight of toluene were mixed and then dispersed using ULTRA-TURRAX to finish the inks for the coating film formation.

(Method of Forming Coating Film)

Coating films were formed on a PET film and a glass plate using the 10-cm-wide Baker applicator set at 4 mil (101.6 μm). After the formation of the coating film, the solvent was evaporated, then the film thickness was examined 9 times at different points using a micrometer, and evaluation was made on the basis of Δ=[maximum film thickness]−[minimum film thickness].

(Evaluation of Surface Unevenness after Drying)

The surface unevenness after drying was determined according to the following criteria.

Good: Maximum film thickness−minimum film thickness=2 μm or less

Acceptable: Maximum film thickness−minimum film thickness=Exceeding 2 μm and less than 5 μm Not Good: Maximum film thickness−minimum film thickness=5 μm or more (Method of Determining Finesse)

In Examples 1 to 9 and Comparative Examples 1 to 2, the ferrite coating films formed as described above were peeled from the glass plates, subjected to debindering at 650° C., and then fired at a sintering temperature of 1200° C. for 4 hours by placing the coating films in the electric furnace under the oxygen concentration of 0 vol % (under $N_2$). The color tone of the sintered films just taken out from the furnace were evaluated by naked eye (the metallic gloss observed by naked eye proves that the fired product is so fine because visible light included in the electromagnetic wave is reflected at the ferrite surface).

(Evaluation of Finesse)

The finesse was determined according to the following criteria.

Excellent: Metallic gloss is observed

Good: Light gray to metallic gloss

Acceptable: Dark gray to light gray

Not Good: Reddish black to dark gray

TABLE 3

| | Conditions of preparation of ink for coating film | | Evaluation of unevenness | | Evaluation of finesse | | |
|---|---|---|---|---|---|---|---|
| | Method of mixing ferrite particles and binder | Type of binder | Substrate | Surface unevenness after sintering | Substrate | Main sintering temperature (° C.) | Finesse |
| Example 1 | Dispersing | Agar | PET film | Good | Glass plate | 1200 | Excellent |
| Example 2 | Dispersing | Agar | PET film | Good | Glass plate | 1200 | Excellent |
| Example 3 | Dispersing | Agar | PET film | Good | Glass plate | 1200 | Excellent |
| Example 4 | Dispersing | Agar | PET film | Good | Glass plate | 1200 | Excellent |
| Example 5 | Dispersing | Agar | PET film | Good | Glass plate | 1200 | Excellent |
| Example 6 | Dispersing | Agar | PET film | Good | Glass plate | 1200 | Excellent |
| Example 7 | Dispersing | Agar | PET film | Good | Glass plate | 1200 | Excellent |
| Example 8 | Dispersing | Agar | PET film | Good | Glass plate | 1200 | Good |
| Example 9 | Dispersing | Agar | PET film | Good | Glass plate | 1200 | Good |
| Example 10 | Dispersing | Acrylic resin | PET film | Good | — | — | — |
| Example 11 | Dispersing | Acrylic resin | PET film | Good | — | — | — |
| Example 12 | Dispersing | Acrylic resin | PET film | Good | — | — | — |
| Comparative Example 1 | Dispersing | Agar | PET film | Acceptable | Glass plate | 1200 | Acceptable |
| Comparative Example 2 | Stirring | Agar | PET film | Not Good | Glass plate | 1200 | Not Good |

As shown in Table 3, all of Examples 1 to 12 are excellent in the unevenness after drying. In particular, Examples 10 to 12 show an improved hydrophobicity, and it was confirmed that sufficient dispersibility was achieved even with a non-aqueous solvent. Furthermore, in Examples 1 to 9, the finesse achieved after sintering are excellent.

In contrast, the unevenness after drying of the coating film was bigger than that in Examples because the shape of the particles was irregular, i.e. a fine fired product was not manufactured after sintering. In Comparative Example 2, the particle size was large and the unevenness after drying of the coating film was also big. A fine fired product was not manufactured after sintering.

INDUSTRIAL APPLICABILITY

As the conventional fillers have an irregular shape as described above, gaps tend to be formed among particles, uniform volume change does not occur during post-treatment (heating or sintering) carried out after molding, and result generation of pores in a coated product or molded product or uneven sintering of the molded product. In contrast, as the ferrite particles according to the present invention are not only particles ferritized by pre-heat treatment but also have a spherical shape, volume change is small even if heat-treated after molding, and the volume change should be uniform.

Furthermore, as the ferrite particles according to the present invention are excellent in dispersibility as a powder and is excellent in uniformity after molding, unevenness after molding is small.

Thus, the ferrite particles according to the present invention are preferably used as a magnetic filler or as a raw material for a molded product, and are particularly suitable for use as a filler in a resin compound for electromagnetic wave shielding or as a magnetic fluid.

The invention claimed is:

1. A manganese-magnesium ferrite particle comprising:
   from 13 to 25% by weight manganese,
   from 1 to 3.5% by weight magnesium, and from 43 to 57% by weight iron, as the manganese-magnesium ferrite;
   the particle having an average particle size of 1 to 2000 nm and a spherical shape; and
   the particle being surface-treated with an aluminum-compound.

2. The particle according to claim 1 further comprising 0 to 1.5% by weight of strontium.

3. A particle comprising a manganese-magnesium ferrite; the particle having an average particle size of 1 to 2000 nm and a spherical shape; and the particle being surface-treated with an aluminum compound.

4. A method of manufacturing a manganese-magnesium ferrite particle having an average particle size of 1 to 2000 nm and a spherical shape;
   the method comprising flame spraying in air a raw material particle comprising an iron material, a manganese material, and a magnesium material to obtain a non-solid manganese-magnesium ferrite and rapidly cooling the non-solid manganese-magnesium ferrite to obtain the magnesium-manganese ferrite particle.

5. The method according to claim 4, wherein the particle comprises from 13 to 25% by weight manganese, from 1 to 3.5% by weight magnesium, and from 43 to 57% by weight iron.

6. The method according to claim 5, wherein the particle further comprises 0 to 1.5% by weight of strontium.

* * * * *